United States Patent [19]

Kim

[11] Patent Number: 5,220,974
[45] Date of Patent: Jun. 22, 1993

[54] FOUR-WHEEL STEERING SYSTEM

[75] Inventor: Chongkap Kim, Ulsan, Rep. of Korea

[73] Assignee: Hyundai Motor Company, Kyongsangnam, Rep. of Korea

[21] Appl. No.: 725,407

[22] Filed: Jul. 1, 1991

Related U.S. Application Data

[63] Continuation of Ser. No. 374,268, Jun. 29, 1989, abandoned.

[30] Foreign Application Priority Data

Mar. 22, 1989 [KR] Rep. of Korea .................. 89-3601

[51] Int. Cl.$^5$ .................................. B62D 5/06
[52] U.S. Cl. .................................. 180/140; 180/143
[58] Field of Search ............... 180/140, 141, 142, 143; 280/91

[56] References Cited

U.S. PATENT DOCUMENTS

| | | | |
|---|---|---|---|
| 4,441,572 | 4/1984 | Ito et al. ............... | 180/140 |
| 4,770,265 | 9/1988 | Allen ..................... | 180/140 |
| 4,778,023 | 10/1988 | Sugasawa ............... | 180/140 |
| 4,781,262 | 11/1988 | Nakamura et al. ...... | 180/140 |
| 4,821,830 | 4/1989 | Tomoda et al. ........ | 180/140 |
| 4,881,613 | 11/1989 | Kanazawa et al. ..... | 180/140 |
| 4,970,646 | 11/1990 | Sugasawa et al. ...... | 180/140 |

Primary Examiner—Mitchell J. Hill

[57] ABSTRACT

The present invention relates to a four-wheel steering system comprising a speed sensor yielding the sped of a vehicle by calculating the pulse in proportion to the number of revolutions of a driving shaft. A frequency oscillating conversion circuit converting and counting detection signal is delivered from the speed sensor. An error amplification circuit amplifying only the error over the pre-designated pulse number from the signal delivered from the frequency oscillating conversion circuit. A solenoid driving circuit drives a solenoid value that opens and shuts the oil pressure passage of the direction control value at the rear wheels according to the signal of the error amplification circuit, and being constituted to the effect that the direction control value of the rear wheels side is set between the oil pressure source and the rear wheels actuator is opened. The fluid pressure direction is controlled at the rear wheels actuator based upon the pressure difference of the left and right side ports of the normal front wheels steering part when the speed of a vehicle is above a standard value, by the control unit which comprises the current detection circuit that feeds back to the error amplification circuit by detecting the current flowing to the solenoid.

8 Claims, 4 Drawing Sheets

FOUR-WHEEL STEERING SYSTEM

This application is a continuation of application Ser. No. 07/374,268, filed Jun. 29, 1989, now abandoned.

BACKGROUND OF THE INVENTION

The present invention relates to the steering system of vehicles, and more particularly to the four-wheel steering system which prevents the instability of car body, so-called yawing, and the vibration of the vehicles during steering at high - speed running, by steering both front wheels and rear wheels simultaneously and properly.

The common steering apparatus changes the direction of front wheels by gearing the tie rod to the left or right relating to the rotating direction of the gear installed at the end of a steering shaft. However, the technical improvement of this kind of steering apparatus comprises the power steering which makes the smooth operation of steering wheel, or keep stability of car body at steering.

By the way, the above common steering apparatus has a problem that a car body becomes inclined suddenly and unstable while steering at high speed running, led away by a car body while running curved roads and thus becomes a primary factor for a side abrasion of a tire.

The above-mentioned is explained in detail as follows.

The unstability of the center of a car body may be softened to a certain extent by the operation of rear wheels-differential gear while steering at normal speed running, but while steering at high speed running, the center of a car body is suddenly leaning towards the inner side of steering, then the differential response becomes late and causes yawing of a car body and a severe abrasion of the tire. This phenomenon shows up more significantly in case of front driving type vehicle which have no differential apparatus at rear wheels.

On the other hand, there has been suggested four-wheel steering system which devices the solution of all drawbacks said above by steering rear wheels in proportion to the steering condition of front wheels. One conventional example of the four-wheel steering system is disclosed in Japanese patent provisionally published application No. 58-20565. In this system, the steering input given when a driver operates a steering wheel is transferred to front wheels and rear wheels simultaneously, then rear wheels are steered at the same value as the steering angle of front wheels by rear wheels steering apparatus.

This method has an advantage that the structure is comparatively simple, but does not get the satisfactable steering stability of a vehicle because front wheels and rear wheels can not be steered respectively due to the condition that the transmission characteristics between a steering input and front wheels steering angle, and the transmission characteristics between a steering input and rear wheels steering angle are set up uniformly with non-variableness.

There is another method of four-wheel steering system.

It is a method that an electronic control unit controls front wheels and rear wheels respectively to be steered with the optimum condition according to the relation between the speed of a vehicle and a steering input.

The examples of the four-wheel steering system with this electronic control method are disclosed in U.S. Pat. Nos. 4,687,214, 4,705,131 and 4,715,466. Most of them featuring the method that the most optimum front and rear wheels steering angle ratio corresponding to the speed of a vehicle (at high speed running of a vehicle) are memorized in the control unit as data and on the other hand the steering actuator operated by the oil pressure is independently set up to front wheels and rear wheels respectively and thus the control unit controls the oil pressure supplied to front and rear wheels actuator respectively according to the signal inputted through the speed sensor of a vehicle while steering at high speed running.

By the way, the said electronic control method has a problem that it is hardly to get the correct and optimum data for steering of front and rear wheels at high speed running because we should take into consideration many external factors, for examples, the speed of a vehicle, the road condition, weather, the driver's style of driving etc, and, moreover, has problems such as decrease of assembly productivity, increase of production cost and difficulty of repairing and maintenance because of the complexity in circuit which steers and controls front wheels and rear wheels respectively.

SUMMARY OF THE INVENTION

It is an object of the present invention to provide the four-wheel steering system which has a simple structure than the said previous method and also controls front and rear wheels respectively according to the four-wheel steering system of which front and rear wheels are controlled respectively by electronic control to solve the drawbacks that the said previous steering system has.

To this end, the present invention is characterized to be composed of the speed sensor which yields the speed of a vehicle by calculating the pulse in proportion to the revolution number of a driving shaft, the frequency oscillating conversion circuit which converts and counts the detection signal delivered from this speed sensor, the error amplification circuit which amplifies only the error over the pre-designated pulse number (standard speed of a vehicle) from the signal delivered form this frequency oscillating conversion circuit, the solenoid driving circuit which drives the solenoid value that opens and shuts the oil pressure passage of the direction control value at rear wheels according to the signal of the said error amplification circuit, and to be constituted to the effect that the direction control value of the rear wheels side set between the oil pressure source and rear wheels actuator is opened and also the fluid pressure direction is controlled to rear wheels actuator according to the pressure difference of the left and right side ports of the normal front wheels steering part when the speed of a vehicle is over the standard value, by the control unit which comprises the current detection circuit that feeds it back to the above said error amplification circuit by detecting the current flowing to the said solenoid.

It is another object of the present invention to provide a four-wheel steering system having a direction control valve at the sides of a rear wheel for steering the rear wheels which can be controlled by a pilot pressure generated from a front wheel actuator.

In the said constitution, for the direction control value at rear wheels, open center type three way-four port valve shall be applied thereto.

BRIEF DESCRIPTION OF THE INVENTION

DETAILED DESCRIPTION OF THE INVENTION

Figure 1:
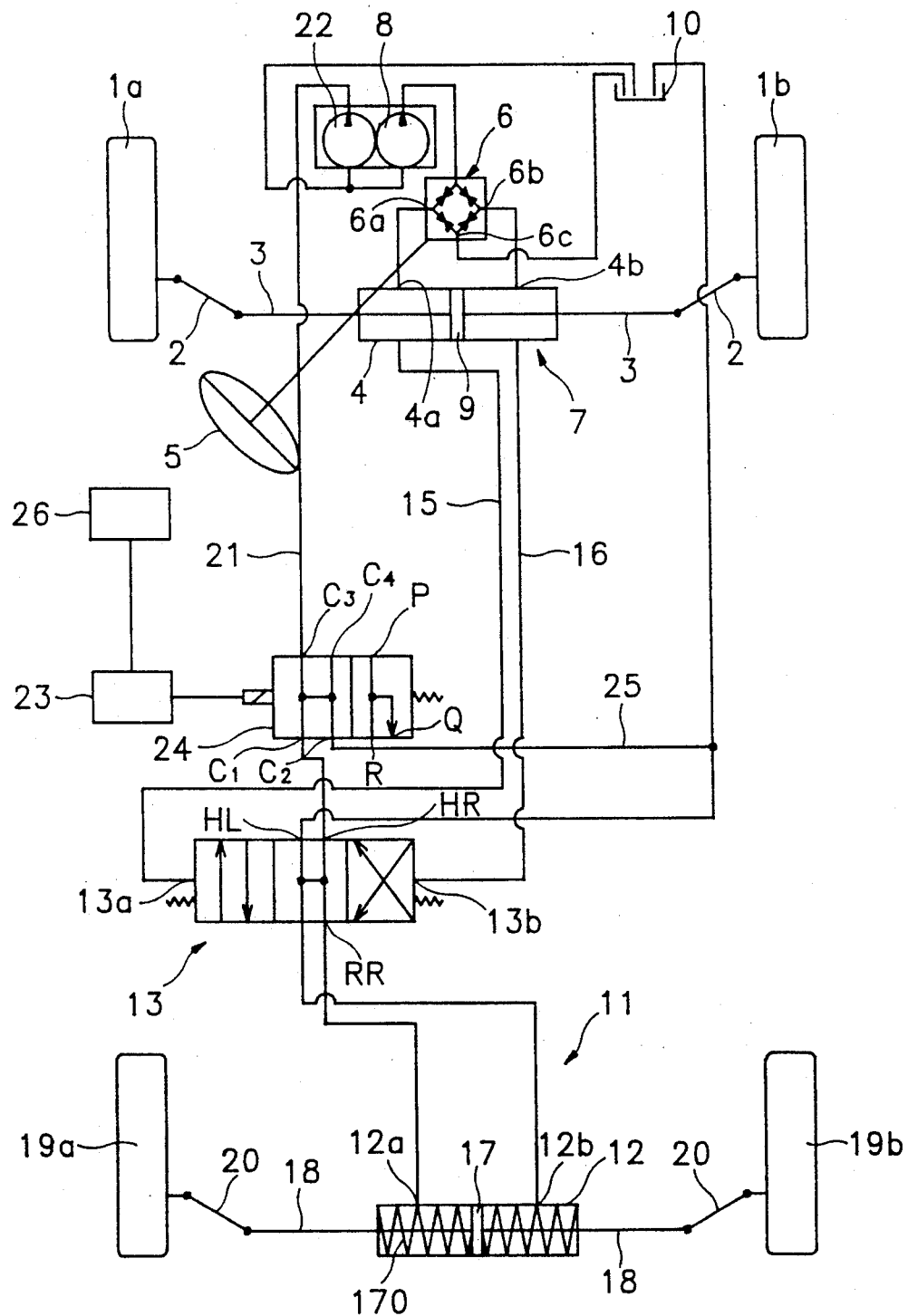
FIG. 1 is a schematic view showing the steering system of the present invention.

As FIG. 1 is a schematic view showing the whole system of the present invention, both front wheel (1a)(1b) are connected to front wheels actuator (4) set between the tie rod(2) jointed by ball and the shaft (3).

The direction control valve(6) at front wheels side controls the pressure direction of the fluid according to the operation direction of the steering wheel(5), and it constitutes the front wheels steering part(7) together with the said front wheels actuator(4).

The left and right ports (4a),(4b) at the front wheels actuator(4) are connected with the left and right port (6a),(6b) of the direction control valve(6) at the front wheels side respectively.

By this constitution, the left and right ports (6a),(6b) of the direction control valve(6) at the front wheels side are opened selectively according to the steering direction of the steering wheel(5). For example, if it is operated forward-left, the left port(6a) of the direction control valve(6) at the front wheels side is opened and linked to the left port(4a) of front wheels actuator (4). Consequently, the fluid pressure from the main pump(8) passes through the left port (6a) of the direction control valve(6) at the front wheels side and flows into the left port(4a) of front wheels actuator(4), and pushes the piston(9) to the right. As the result of this operation, the shaft(3) connected with the piston(9) is coupled to the right and both front wheels(1a)(1b) are steered to the left. Also, if the steering wheel(5) is operated forward-right, the right port(6b) of the direction control valve(6) at the front wheels side is linked to the right port(4b) of front wheels actuator(4) and thus both front wheels (1a)(1b) are steered to the right.

On the other hand, when a vehicle is at a position straight ahead the left and right ports(6a),(6b) of the direction control valve(6) at the front wheels side are all closed, and then the by-pass port(6c) is opened and thus the fluid pressure is sent to the reserve tank(10).

Therefore, in case of straight ahead position, the piston(9) of front wheels actuator(4) is laid on neutral position, and both front wheels (1a)(1b) are positioned straight state.

The left and right pressure rooms divided by the piston(9) at the said front wheels actuator(4) are linked through the pilot line (15)(16) to the left and right ports (13a),(13b) of the direction control valve(13) at the rear wheels side which controls selectively the direction of fluid pressure applied to rear wheels actuator(12) of the rear wheels steering part(11) so that the rear wheel actuator can be controlled by a pilot pressure.

For the said direction control valve(13) at the rear wheels side, a three way-four port valve of the open center type is applied in this embodiment, and accordingly we can get an advantage that the port connection terminal is converted by reacting to the difference of the pressure applied form the left and right pressure room of front wheels actuator(4) by steering.

For example, if the pilot pressure valve of the left pressure room of front wheels actuator(4) is larger than that of the right pressure room, the port (RL),(HL) and the port(RR),(HR) of the direction control valve(13) at the rear wheels side are linked, while in case of the contrary the port (RL), (HR) and the port (RR)(HL) are linked respectively.

The said port(RL)(RR) are linked to the left and right ports(12a,(12b) of the rear wheels actuator(12) respectively.

The rear wheels actuator(12) of the rear wheels steering port(11) is connected to the rear wheels(19a)(19b) by ball-jointing or the tie rod(18) which can move to the left or right to the shaft(20) by the piston(17) in the same method as in the constitution of the said front wheels steering part(7).

The said direction control valve(13) at the rear wheels side passes through the oil pressure line(21) and are linked with the subpump(22), and also the solenoid valve(24) driven by the control unit(23) is set up at the oil pressure line(21).

The fluid pressure supplied from the subpump(22) is by-passed to the reserve tank(10) through return line(25) when a vehicle is under the state of going straight.

Figure 2:
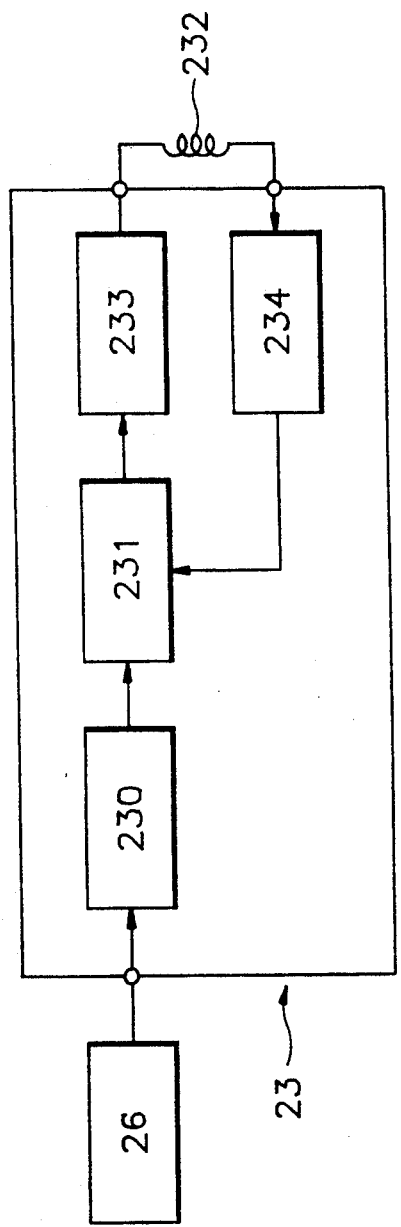
FIG. 2 is a block diagram illustrating the control unit of FIG. 1.

The control nit(23) amplifies only the error over the standard value by receiving the pulse signal from the speed sensor(26). The speed sensor (26) determines the speed of a vehicle by perceiving a pulse which is in proportion to the revolution number of a driving shaft. The control unit 23 then displaces and controls the valve spool of the said solenoid valve(24) according tot he amplified error signal. FIG. 2 shows the circuit diagram of this control unit(23).

That is, the control unit(23) is composed of the frequency oscillation conversion circuit(230) which oscillates and converts the frequency by receiving the pulse signal sent from the speed sensor(26), the error amplification circuit(231) which sends the signal by amplifying the error in case the error over the standard value is included in the signal transferred from this frequency oscillation conversion circuit(230) when the speed of a vehicle is high, the solenoid driving circuit(233) which transfers the constant circuit to the solenoid(232) by modulating the error amplification pulse, with pulse width and the current detection circuit(234) which stabilizes the amplification rate of the output frequency of the error amplification circuit(231) by perceiving and feeding back the current to the said error amplification circuit(231) when the current flows to the said solenoid(232).

Figure 3:
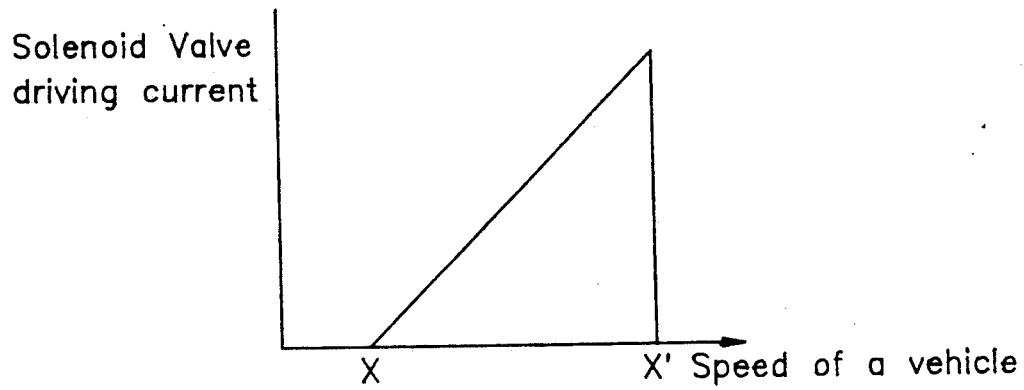
FIG. 3 is a graph showing the relation between the solenoid valve driving current and the speed of a vehicle of FIG. 1.

From the above-said control unit(23) the solenoid driving current increases in proportion to the increase of the speed of a vehicle from the increasing speed step X point to the high speed step X' point as illustrated in FIG. 3 according to the amount of amplified error amplified at the error amplification circuit when the speed of a vehicle exceeds the standard value.

The present invention constituted as the above is applied dividedly in the case of normal speed running and high speed running.

First, at the normal speed running, the direction control valve(6) at the front wheels side of the front wheels steering part(7) is displaced as the steering wheel(5) is steered.

Accordingly the left or right port (6a)(6b) of the direction control valve(6) at the front wheels side are opened, and thus the oil pressures given from the main pump(8) flows into the left or right pressure room through the left or right port(4a)(4b) of the front wheels actuator(4).

As results, the piston(9) is pushed to the left or right following the direction which the oil pressure is applied to, and thus the shaft(3) connected with this piston(9) is linked and the steering of front wheels (1a)(1b) is finally accomplished.

Of course, the steering direction of a vehicle is determined subject to the pressure direction of the fluid following the steering direction of the steering wheel(5), as mentioned above.

In the above-said operation process the running speed of a vehicle is detected by the speed sensor 26, and this detected value is oscillated and converted at the frequency oscillation conversion circuit(23) of the control unit(23), and thus it is transferred to the error amplification circuit (231).

But, because the error component included in the oscillated and converted pulse is within the standard level, that is, at the normal speed running, the error amplification circuit (231) does not emit any signal. As results, the open center of the solenoid valve(24) is opened, and thus the rear wheels steering part(11) keeps the non-operating condition which is not influenced by the oil pressure as the oil pressure brought from the sub pump(22) by-passes the reserve tank(10) through the return line(25).

But, if the speed of a vehicle comes to the increasing speed running over the standard value, the said frequency oscillation conversion circuit(230) oscillates and converts the frequency by receiving the pulse signal which is sent from the speed sensor(26) and also the error over the standard value which is included in the pulse oscillated and converted by the said error amplification circuit(231) is amplified and then emits the solenoid driving signal.

If the driving signal is applied to the solenoid driving circuit(232), the constant current is supplied to the solenoid(232) obtained by modulating pulse width according to the said error amplification pulse, and the solenoid valve(24) is driven and opened, and the oil pressure is not supplied to the return line(25). A result, the oil pressure brought from the sub pump (22) is to be a control pressure and is applied to the direction control valve(13) at the rear wheels side of the rear wheels steering part(11).

Under the above circumstances, the pressure direction which passes through the direction control valve(13) at the rear wheels side and the oil pressure are controlled according to the pilot pressure difference of the left and right pressure room of the said front wheels actuator(4) applied to the direction control valve(13) at the rear wheels side by way of the pilot line(15)(16). That is, if the pressure valve of the left pressure room of front wheels actuator(4) is larger than that of the right pressure room, the pressure of the right pressure room of front wheels actuator(4) is applied to the right input port (13b) of the direction control valve(13) at the rear wheels side through the oil pressure line(15), and the port(RL),(HL) and the port (RR),(HR) are linked, and thus the oil pressure of the subpump(22) is supplied to the left pressure room through the left port(12a) of rear wheels actuator(12) and the rear wheels(19a)(19b) turns to the left.

Also, in case of the contrary if front wheels are in right direction because the pressure of the left pressure room of front wheels actuator(4) is applied to the left input port (13a) of the direction control valve(13) at the rear wheels side through the oil pressure line(16), the port (RL),(HL) of the direction control valve(13) at the rear wheels side and the port(RR)(HL) are linked respectively, and thus the oil pressure of the subpump(22) is supplied to the right port (12b) of rear wheels actuator(12) and the rear wheels(19a)(19b) turn to the right.

Therefore, the piston(17) of rear wheels actuator(12) moves equal to the stroke which the piston(9) of front wheels actuator(4) moved, and steers the rear wheels(-19a)(19b) to the left or right, and thus makes them the same phase as the front wheels(1a)(1b).

Figure 4:
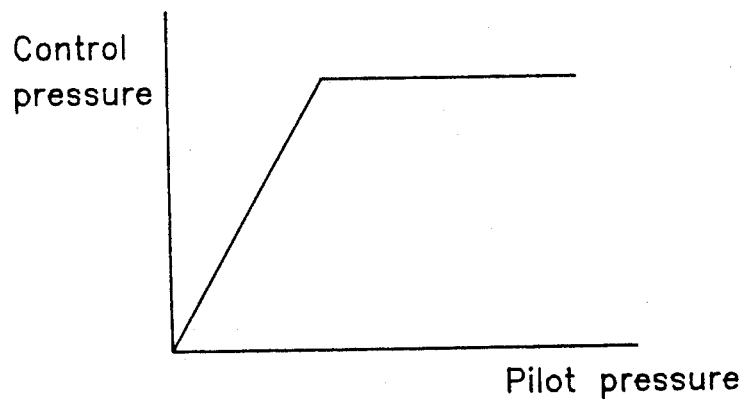
FIG. 4 is a graph showing the oil pressure characteristics of the direction control valve at rear wheels side to the left and right pressure of the cylinder of front wheels actuator at steering front wheels.

In the present invention the oil pressure control characteristics of the directional control valve(13) at the rear wheels side, as shown in the graph of FIG. 4, is that the control pressure and the pilot pressure increase mutually in proportion until they reach a certain value.

Figure 5:
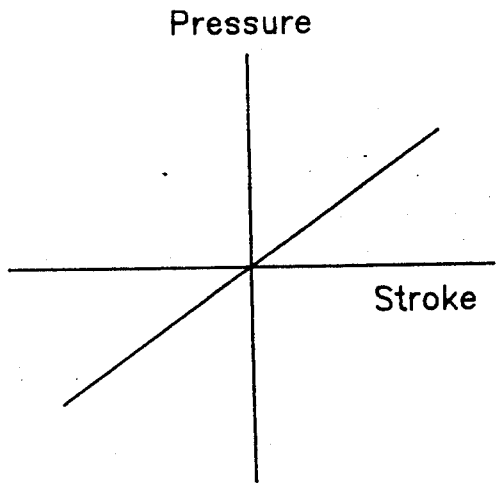
FIG. 5 is a graph showing the characteristics between the pressure of rear wheels actuator and stroke.

Also, the stroke of the piston(17) by the pressure applied to rear wheels actuator(12), as shown in the graph of FIG. 5, is in proportion to the pressure supplied to rear wheels actuator(12) and increases to the symmetrical direction within the left and right cylinder.

Figure 6:
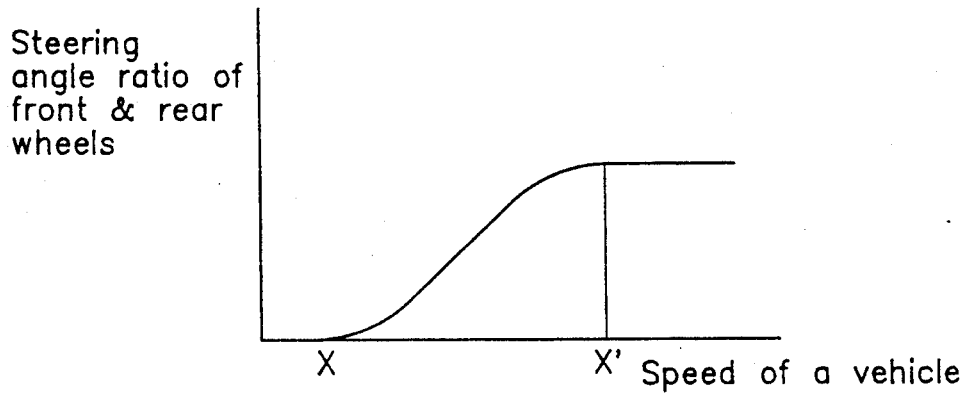
FIG. 6 is a graph showing the steering angle ratio of front and rear wheels to the speed of a vehicle.

FIG. 6 shows the steering angle ratio of the front and rear wheels to the speed of a vehicle given in the embodiment of the present invention. The steering of rear wheels(19a)(19b) to front wheels (1a)(1b) is started at the increasing speed step X point and increases almost in proportion to the speed increase to the high speed step X' point, and keeps a constant value after the high speed step X' point.

Figure 7:
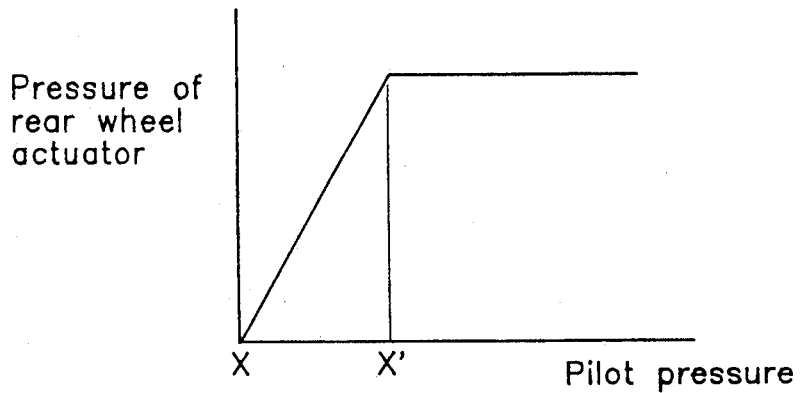
FIG. 7 is a graph showing the characteristic between the pilot pressure of front wheel actuator and the pressure of rear wheels actuator at the constant solenoid valve driving current.
Figure 8:
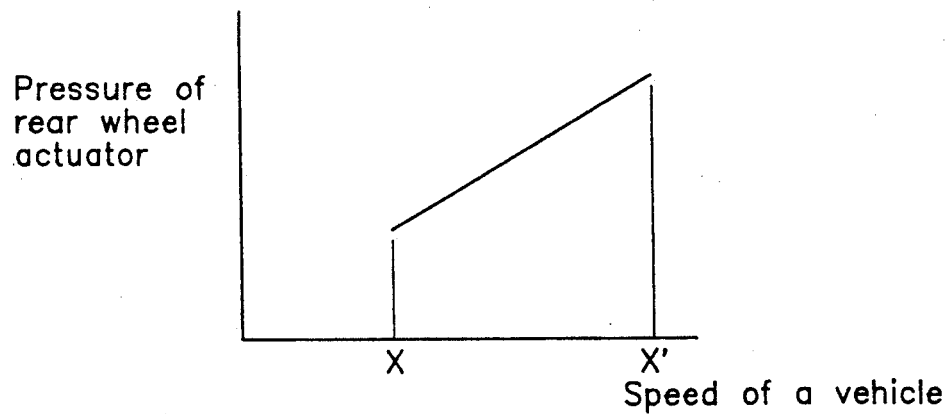
FIG. 8 is a graph showing the pressure characteristics of rear wheels actuator to the speed of a vehicle.

If the steering of rear wheels(19a)(19b) is to increase proportionally from the increasing speed step X point to the high speed step X' point, the pilot pressure applied to rear wheels actuator(12), as shown in the graph of FIG. 7, should increase proportionally from the increasing speed step X point to the high speed step X' point and also the pressure of rear wheels actuator(12), as shown in the graph of FIG. 8, should increase proportionally from the increasing speed step X point to the high speed step X' point. This operation can be easily done by controlling the solenoid driving current of the solenoid valve(24), as done in the embodiment of the present invention.

By the way it is desirable to apply elastic force in the opposite direction of said rear wheels actuator(12) by placing the elastic material, for example, a coil spring(170) on both sides of the piston(17).

Because of said elastic material, the piston(17) always keeps the neutral position in rear wheels actuator(12) during the time of non-operation (i.e., straight running or normal speed running) so that it can eliminate wrong operation of rear wheels actuator(12) which might be occurred by the external force from the ground while running on unpaved road.

As mentioned above, the present invention have the advantages in that in comparison with the previous method assembling process is simple because number of component parts can be reduced since constitution of oil pressure circuit which is necessary for the four-wheel steering system can be made simply, and that production cost can be lowered significantly and that the steering can be stably accomplished without yawing at high speed running as done in the previous four-wheel steering system.

What is claimed is:

1. A four-wheel steering system for steering front wheels and rear wheels of a vehicle, the rear wheels steered according to vehicle speed, the system comprising:

a fluid powered front wheels actuator having a left port and a right port for steering the front wheels;

a front wheels direction control valve for controlling the front wheels actuator in response to a steering wheel having a left, right and neutral position;

a main pump for providing pressurized fluid to the front wheels direction control valve;

a fluid powdered rear wheels actuator for steering the rear wheels;

a rear wheels direction control valve having a left port and a right port for controlling the rear wheels actuator;

a subpump for providing pressurized fluid through a fluid pressure line;

a solenoid controlled valve for directing the pressurized fluid from the subpump to a fluid reserve tank when the steering wheel is in a neutral position and the solenoid controlled valve directing the pressurized fluid from the subpump to the rear wheels actuator when the steering wheel is in the left or right positions;

a first pilot line connecting pressurized fluid from the left port of the front wheels actuator to the left port of the rear wheels direction control valve; and a second pilot line connecting pressurized fluid from the right port of the front wheels actuator to the right port of the rear wheels direction control valve wherein the front wheels actuator controls the rear wheels direction control valve.

2. The four-wheel steering system of claim 1 wherein the rear wheel direction control valve comprises a three way-four port valve.

3. The four-wheel steering system of claims 1 or 2 wherein the pressurized fluid from the first and second pilot lines and the pressurized fluid from the subpump to the rear wheels actuator increase mutually in proportion until reaching a threshold valve.

4. The four-wheel steering system of claim 1 wherein the rear wheels actuator has a piston which strokes to increase in proportion to the pressurized fluid supplied from the subpump.

5. The four-wheel steering system of claim 1 wherein the rear wheels actuator has a piston biased in a neutral position by a coil spring.

6. The four-wheel steering system of claim 1 wherein the front wheels direction control valve has a left port and a right port respectively connected to the left port and right port of the front wheels actuator.

7. The four-wheel steering system of claim 1 wherein the rear wheels actuator has a left port and a right port respectively connected to the left port and right port of the rear wheels direction control valve.

8. Four-wheel steering system according to claim 1 wherein, with respect to a front and rear wheels steering angle ratio to the speed of a vehicle, rear wheel steering for front wheels is started at an increasing speed step and increases in proportion to the speed to a high speed step, and keeps a constant level after the high speed step.

* * * * *